United States Patent
Slaughter et al.

(10) Patent No.: US 6,801,415 B2
(45) Date of Patent: Oct. 5, 2004

(54) NANOCRYSTALLINE LAYERS FOR IMPROVED MRAM TUNNEL JUNCTIONS

(75) Inventors: Jon M. Slaughter, Tempe, AZ (US); Renu W. Dave, Chandler, AZ (US); Jijun Sun, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 147 days.

(21) Appl. No.: 10/232,111

(22) Filed: Aug. 30, 2002

(65) Prior Publication Data

US 2004/0042128 A1 Mar. 4, 2004

(51) Int. Cl.[7] .................................................. G11B 5/39
(52) U.S. Cl. ............................... 360/324.2; 360/324.11
(58) Field of Search .................... 360/324.1, 324.11, 360/324.12, 324.2; 257/295; 428/692; 324/252; 338/32 R

(56) References Cited

U.S. PATENT DOCUMENTS

| | | | | |
|---|---|---|---|---|
| 5,264,070 A | * | 11/1993 | Urquhart et al. ............... 117/97 |
| 5,861,328 A | | 1/1999 | Tehrani et al. ............... 438/210 |
| 5,948,553 A | * | 9/1999 | Kamijo ........................ 428/692 |
| 5,955,211 A | | 9/1999 | Maeda et al. ................ 428/692 |
| 6,072,671 A | * | 6/2000 | Gill ............................. 360/126 |
| 6,114,056 A | * | 9/2000 | Inomata et al. .............. 428/692 |
| 6,181,537 B1 | | 1/2001 | Gill ........................... 360/324.2 |
| 6,205,052 B1 | | 3/2001 | Slaughter et al. ............ 365/173 |
| 6,519,121 B1 | * | 2/2003 | Gill ........................ 360/324.11 |
| 6,538,859 B1 | * | 3/2003 | Gill ........................ 360/324.12 |
| 2002/0047145 A1 | * | 4/2002 | Nickel ......................... 257/295 |
| 2002/0097534 A1 | * | 7/2002 | Sun et al. ................. 360/324.2 |
| 2002/0097539 A1 | * | 7/2002 | Hasegawa et al. ...... 360/324.11 |

FOREIGN PATENT DOCUMENTS

| JP | 2001-297913 A | * | 10/2001 |
|---|---|---|---|
| JP | 2001-345494 A | * | 12/2001 |

* cited by examiner

Primary Examiner—Jefferson Evans
(74) Attorney, Agent, or Firm—Ingrassia Fisher & Lorenz PC

(57) ABSTRACT

An improved and novel device and fabrication method for a magnetic element, and more particularly a magnetic element with a crystallographically disordered seed layer and/or template layer seeding the nanocrystalline growth of subsequent layers, including a pinning layer, a pinned layer, and fixed layer.

25 Claims, 1 Drawing Sheet

NANOCRYSTALLINE LAYERS FOR IMPROVED MRAM TUNNEL JUNCTIONS

TECHNICAL FIELD

The present invention generally relates to magnetoelectronics, and more particularly to material composition and fabrication techniques for magnetoelectronics elements.

BACKGROUND OF THE INVENTION

Magnetoelectronics, spin electronics, and spintronics are synonymous terms for the use of effects predominantly caused by electron spin. Magnetoelectronics is used in numerous information devices, and provides non-volatile, reliable, radiation resistant, and high-density data storage and retrieval. The numerous magnetoelectronics information devices include, but are not limited to, magnetic random access memory (MRAM), magnetic sensors and read heads for disk drives.

Typically, a magnetoelectronic device, such as a magnetic memory element, has a structure that includes multiple ferromagnetic layers separated by at least one non-magnetic layer. Information is stored as directions of magnetization vectors in the magnetic layers. Magnetic vectors in one magnetic layer, for instance, are magnetically fixed or pinned, while the magnetization direction of the other magnetic layer is free to switch between the same and opposite directions that are called "parallel" and "antiparallel" states, respectively. In response to parallel and antiparallel states, the magnetic memory element represents two different resistances. The resistance has minimum and maximum values when the magnetization vectors of the two magnetic layers point in substantially the same and opposite directions, respectively. Accordingly, a detection of change in resistance allows a device, such as an MRAM device, to provide information stored in the magnetic memory element. The difference between the minimum and maximum resistance values, divided by the minimum resistance is known as the magnetoresistance ratio (MR).

The physical structure of these magnetic elements typically includes very thin layers, some of which are tens of angstroms thick or less. The performance of the magnetic element is sensitive to condition of the surface on which the magnetic layers are deposited. Accordingly, it is generally desirable to make as flat a surface as possible in order to prevent the operational characteristics of a magnetic element from degrading.

During typical magnetic element fabrication, such as MRAM element fabrication, which includes metal films grown by sputter deposition, evaporation, or epitaxy techniques, the film surfaces are not absolutely flat but instead tend to exhibit surface or interface roughness. This roughness of the surfaces and/or interfaces of the ferromagnetic layers is the cause of magnetic coupling between the free ferromagnetic layer and the other ferromagnetic layers, such as the fixed layer or pinned layer, which is known as "topological coupling" or "Néel's orange peel coupling." Such coupling is generally undesirable in magnetic elements because it can create an offset in the response of the free layer to an external magnetic field.

The roughness can also have undesirable effects on the electrical properties of the device by affecting the quality of the interfaces between the magnetic layers and the non-magnetic spacer layer. In a typical tunnel junction application, such roughness may also lead to variations in the thickness of the spacer layer and, correspondingly, to variations in the resultant tunneling current.

A magnetic structure is known as "bottom pinned" when the fixed layer is formed before the spacer layer, and the free layer is formed after the spacer layer. In such a bottom-pinned structure the antiferromagnetic (AF) pinning layer is contained in the bottom magnetic electrode. Conventional bottom-pinned magnetic tunnel junctions (MTJs) and spin valve structures typically use seed and template layers to produce an oriented, crystalline AF layer for strong pinning. The bottom electrode of a typical bottom-pinned MTJ structure includes stacked layers of Ta/NiFe/FeMn/NiFe, which is followed by the AlOx tunnel barrier, and a top electrode that typically includes a free layer of NiFe, where the Ta/NiFe seed/template layers induce growth of large and highly oriented FeMn crystallites in the FeMn layer and the pinned magnetic layer. Such highly oriented polycrystalline layers may also be described as being "strongly textured." This strongly textured FeMn layer provides for strong pinning of the NiFe layer below the AlOx tunnel barrier. The FeMn layer, or other oriented polycrystalline AF layer typically produces a roughness that can cause an increase in the undesirable Néel coupling between the pinned NiFe layer and the top free NiFe layer as well as variations in the tunneling current.

In practical MTJ elements, the bottom electrode is generally formed upon a base metal layer that provides a relatively low resistance contact to the junction. The base metal layer is typically polycrystalline and tends to grow in a columnar-like fashion. This can produce a roughness that, in turn, propagates into the bottom electrode and produces roughness at the spacer layer interfaces, resulting in an increase in undesirable magnetic and electrical properties. The roughness propagated from the base metal layer and the bottom electrode is additionally disadvantageous because it limits the minimum tunnel barrier thickness that can be achieved while retaining high MR and device resistance that scales inversely with junction area.

In order to reduce the roughness of the layers and the layer interfaces, various types of non-crystalline or amorphous materials have been developed for use in the various layers of the MTJ stack. Since the non-crystalline or amorphous materials lack the crystal boundaries and sharp features of other materials, the tunnel barrier resulting from the layers with the amorphous materials can provide for better device performance. However, while the use of amorphous materials can be desirable, this requirement dramatically limits the choice of alloys for the magnetic layers to those few that are amorphous. In addition, a thin layer of amorphous magnetic material formed on a crystalline pinning layer tends to replicate at least some of the surface roughness of the underlying surface. This leads to diminished value for the layer of amorphous material.

Accordingly, it is desirable to provide materials and methods for consistently creating smooth layer interfaces in MTJ stacks, thereby enhancing the performance of the magnetic elements formed thereby. Furthermore, other desirable features and characteristics of the present invention will become apparent from the subsequent description and the appended claims, taken in conjunction with the accompanying drawings.

BRIEF DESCRIPTION OF THE DRAWINGS

The following detailed description of the drawings is merely exemplary in nature and is not intended to limit the invention or the application and uses of the invention.

Furthermore, there is no intention to be bound by any theory presented herein.

The present invention will hereinafter be described in conjunction with the appended drawing figures, wherein like numerals denote like elements, and:

FIG. 1 is a cross-sectional view of a magnetic element with improved magnetic response according to a preferred exemplary embodiment of the present invention;

FIG. 2 is a schematic representation of x-ray diffraction spectra for a conventional polycrystalline material; and FIG. 3 is a schematic representation of x-ray diffraction spectra for a nanocrystalline material in accordance with a preferred exemplary embodiment of the present invention.

DETAILED DESCRIPTION OF THE DRAWINGS

The following detailed description of a preferred embodiment is merely exemplary in nature and is not intended to limit the invention or the application and uses of the invention. Furthermore, there is no intention to be bound by any theory presented in the preceding background of the invention or the following detailed description of a preferred exemplary embodiment.

In the various preferred embodiments of the present invention, a nanocrystalline antiferromagnetic layer is employed. For purposes of the following discussion of the various preferred embodiments, nanocrystalline means a polycrystalline material with an average crystallite size preferably less than 10 nanometers (100 Å), having little or no preferred orientation or texture. This nanocrystalline structure is seeded by an appropriate choice of seed layer and template layer as described in FIG. 1. The nanocrystalline antiferromagnetic layer produces a more desirable surface roughness than a conventional textured polycrystalline layer. Further, the nanocrystalline antiferromagnetic layer may be used to seed a similar nanocrystalline in the layers deposited on it resulting in more desirable interface roughness characteristics for those layers. In the various preferred embodiments of the present invention, this improved interface results in improved magnetic and electrical properties.

Figure 1:
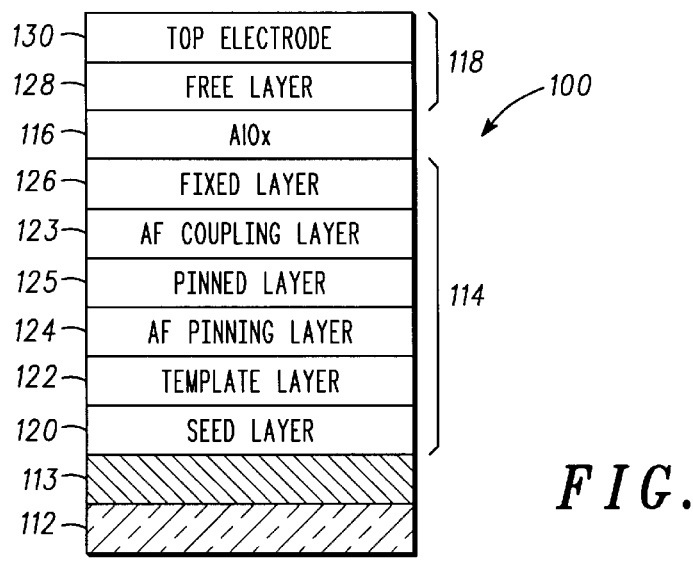

Referring now to FIG. 1, a magnetic element 100 suitable for use with a preferred exemplary embodiment of the present invention is shown. The structure of magnetic element 100 includes a substrate 112, a first electrode multilayer stack 114, a spacer layer 116 including oxidized aluminum, and a second electrode multilayer stack 118. It should be understood that the material composition of spacer layer 116 is dependent upon the type of magnetic element being fabricated.

More particularly, in a typical MTJ structure, spacer layer 116 is formed of a dielectric material, and in a spin valve structure, spacer layer 116 is formed of a conductive material. First electrode multilayer stack 114 and second electrode multilayer stack 118 include one or more ferromagnetic layers. First electrode multilayer stack 114 is formed on a base metal layer 113, which is formed on substrate 112. Base metal layer 113 may be composed of a single metal material or layer or a stack of more than one metal material or layer.

First electrode multilayer stack 114 includes a seed layer 120, deposited on base metal layer 113, a template layer 122, a layer of antiferromagnetic (AF) pinning material 124, a pinned ferromagnetic layer 125 formed on and exchange coupled with the underlying AF pinning layer 124, an antiferromagnetic coupling layer 123 formed on pinned layer 125, and a fixed ferromagnetic layer 126 deposited on coupling layer 123 and anti-ferromagnetically coupled to pinned layer 125 through coupling layer 123. Ferromagnetic layers 125 and 126 are described as fixed, or pinned, in that the magnetic moment for these layers is prevented from rotation in the presence of an externally applied magnetic field.

In one preferred embodiment of the present invention, seed layer 120 is formed of tantalum nitride (TaNx) and is fabricated by a plasma or ion-beam nitridization process with a relatively thin, preferably less than about 100 Å and most preferably less than about 50 Å, layer of tantalum (Ta). In this embodiment, template layer 122, preferably comprised of a nickel iron (NiFe) alloy, a nickel iron cobalt (NiFeCo) alloy, ruthenium (Ru) or tantalum (Ta), is then deposited over tantalum nitride (TaNx) seed layer 120. Additionally, in certain preferred embodiments of the present invention, tantalum nitride (TaNx) made by the nitridization process described herein may be used to seed the desired antiferromagnetic layer without the necessity of a separate template layer 122.

This combination of layered materials combines to produce a highly disordered seed layer for the formation of subsequent layers in magnetic element 100. It should be noted that template layer 122 is most preferably nanocrystalline in nature and is not amorphous. Similarly, the layers above template layer 122, such as AF pinning layer 124, pinned layer 125, coupling layer 123, and fixed layer 126 may be nanocrystalline in nature.

In an alternative preferred embodiment of the present invention, seed layer 120 and template layer 122 are formed by depositing a layer of ruthenium (Ru) onto a layer of aluminum (Al). This combination, as with the previously disclosed TaNx layer described above, combine to produce a highly disordered seed layer for the formation of subsequent layers in magnetic element 100. For this particular embodiment, a typical seed layer 120 and template layer 122 would be comprised of Al 20 Å and Ru 17 Å. It should be noted that although the Al and Ru combine to form an alloy, they are deposited separately in different process steps. The crystal structure of the resulting alloy is highly disordered and relatively random in nature. The Ru layer is preferably less than about 100 Å and most preferably less than about 50 Å. In addition to Ru, other transition metal elements may be combined with Al layer 120 to provide similar results.

Regardless of the specific materials used to fabricate seed layer 120 and template layer 122, the combination of seed layer 120 and template layer 122 provide the base for AF pinning layer 124. As previously discussed, any material or process which forms a highly disordered seed/template for seeding the growth of nanocrystalline AF pinning layer 124 is considered within the scope of the present invention. After the formation of seed layer 120 and template layer 122, AF pinning layer 124 is fabricated from a manganese alloy, with the general composition MnX, where X is preferably one of platinum (Pt), palladium (Pd), nickel (Ni), iridium (Ir), osmium (Os), ruthenium (Ru), or iron (Fe).

The most preferred embodiments of AF pinning layer 124 include manganese alloys where X is in the range of 35%–55% and most preferably in the range of 40%–50% and X is one of Pt, Pd, or Ni. Other preferred embodiments include manganese alloys where X is in the range of 5%–35% and most preferably in the range of 10%–30% and X is preferably one of Ir, Rh, Os, Ru, or Fe. By creating AF pinning layer 124 as described herein, a nanocrystalline ferromagnetic layer 125 may be realized. Disordered template layer 122 seeds AF pinning layer 124 to grow a nanocrystalline crystal structure composed of approximately random-oriented crystallites with an average size of less than 10 nanometers.

In the most preferred embodiments of the present invention, ferromagnetic layers 125 and 126 are separated by AF coupling layer 123. AF coupling layer 123 is most preferably comprised of ruthenium and, combined with ferromagnetic layers 125 and 126, creates a synthetic antiferromagnet (SAF) pinned layer. The antiferromagnetic coupling provided through AF coupling layer 123 makes magnetic element 100 more stable in applied magnetic fields. Additionally, by varying the thickness of ferromagnetic layers 125 and 126, magnetostatic coupling can be offset and the free layer hysteresis loop can be centered. While Ru is the most preferred material for AF coupling layer 123, other non-magnetic materials such as Rh can provide the desired AF coupling between ferromagnetic layers 125 and 126 and may be used for AF coupling layer 123. The nanocrystalline structure of AF pinning layer 124 may further seed the growth of the layers above it in a random way, resulting in the pinned SAF structure having a nanocrystalline structure. This provides an additional benefit by extending the nanocrystalline structure to the interface with spacer layer 116, thereby inhibiting an increase in roughness that would otherwise occur if larger crystallites were to grow in the pinned SAF structure.

Second electrode stack 118 includes a free ferromagnetic layer 128 and a protective contact layer 130. The magnetic moment of the free ferromagnetic layer 128 is not fixed, or pinned, by exchange coupling, and is therefore free to rotate in the presence of an applied magnetic field. While depicted as a single layer in FIG. 1, in some applications free ferromagnetic layer 128 may be fabricated as a multi-layer stack rather than a single ferromagnetic layer.

In the most preferred embodiments of the present invention, the various nanocrystalline layers in first electrode multilayer stack 114 are most preferably achieved by seeding the various layers with a crystallographically disordered layer, as opposed to seeding with an amorphous material. The small, relatively random and disordered grains of seed layer 120 and/or template layer 122 seed the growth of different competing orientations in relatively close proximity to each other. These competing orientations "frustrate" the typical polycrystalline layer formation process in AF pinning layer 124, making it crystallographically disordered and typically randomly oriented and nanocrystalline in nature.

By using the methods of the present invention to create seed layer 120 and/or template layer 122, smoother interfaces are exhibited in the subsequent layers of first electrode multilayer stack 114 and second electrode multilayer stack 118. These interfaces are smoother than would be found in a conventionally grown material with strong crystalline order and well-defined crystal texture. These smoother interfaces result in improved performance in the magnetic element formed thereby.

It should be understood that a reversed, or flipped, structure is also anticipated by this disclosure. More particularly, it is anticipated that the disclosed magnetic element can be formed to include a top fixed, or pinned layer, and thus be described as a "top pinned" structure. In the case of a top pinned structure, the free layer would be grown on the disordered seed and/or template layer. The nanocrystalline structure may extend to the free layer or up through the AF pinning layer, depending on the specific materials used in fabricating the stack.

Figure 2:
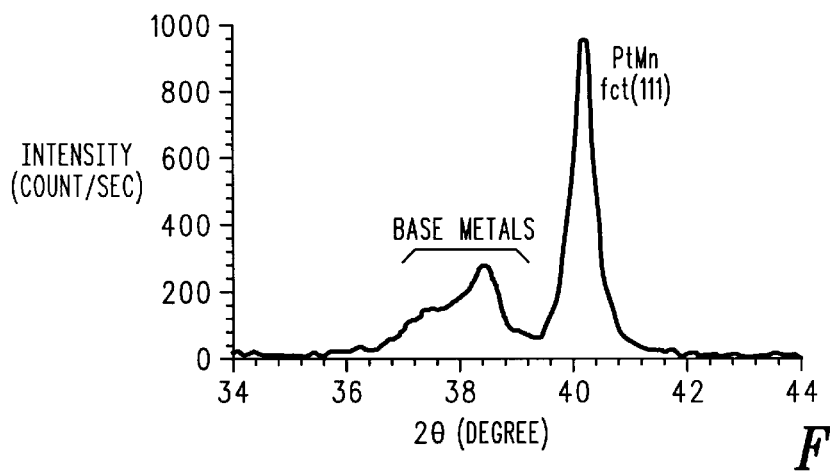
Figure 3:
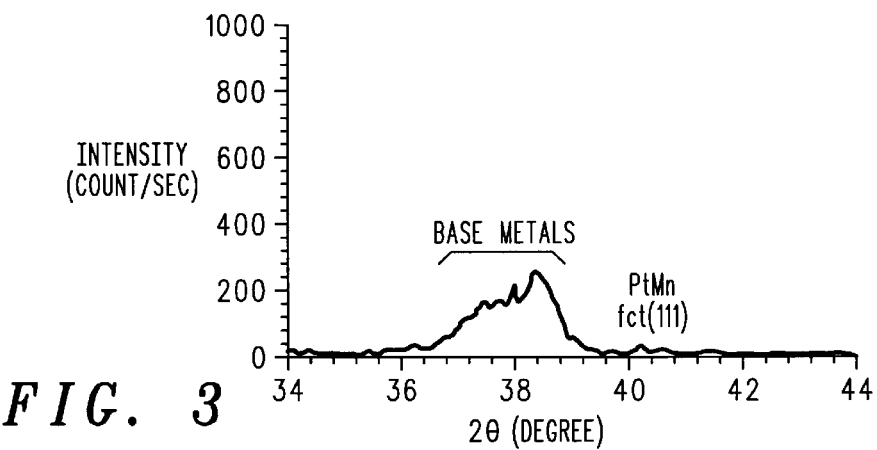

Referring now to FIGS. 2 and 3, a comparative x-ray diffraction view of two similar multi-layer structures is presented. The two multi-layer structures are substantially the same with the notable exception of the template layer formed on the seed layer in the two different structures. In the case of FIG. 2, the template layer is fabricated using a fairly typical nickel iron (NiFe) alloy. In the case of FIG. 3, the template layer is fabricated using the nanocrystalline aluminum ruthenium (AlRu) alloy of the present invention as described in conjunction with FIG. 1. Both FIGS. 2 and 3 show the peak for the face-centered tetragonal (111) crystal plane exhibited by the platinum manganese (PtMn) pinning layer of the structure.

Referring now to FIG. 2, diffraction spectra 200 is the x-ray diffraction for a structure comprising a silicon-silicon oxide (Si—SiO$_2$) substrate, a Ta 50 Å/Al 200 Å/Ta 50 Å base metal layer, a Ta 50 Å seed layer, an NiFe 20 Å template layer, a PtMn 300 Å AF layer, and a Ta 50 Å/Al 50 Å protective cap. As shown in FIG. 2, the PtMn layer grown over the NiFe template layer exhibits characteristics that are fairly typical for conventional textured polycrystalline materials. In particular, the relatively strong (111) peaks indicate the relatively large size of the crystallites that will translate to a relative rougher interface.

Referring now to FIG. 3, diffraction spectra 300 is the x-ray diffraction for a structure comprising an Si—SiO$_2$ substrate, a Ta 50 Å/Al 200 Å/Ta 50 Å base metal layer, a Ta 50 Å seed layer, an Al 20 Å/Ru 17 Å template layer, a PtMn 300 Å AF layer, and a Ta 50 Å/Al 50 Å protective cap. As shown in FIG. 3, the disordered nature of the template layer has created a nanocrystalline PtMn layer. In particular, the relatively weak (111) peaks indicate the relatively small size of the crystallites in the pinning layer that will translate to a relatively smoother interface.

From the foregoing description, it should be appreciated that the use of the specific layered materials and methods disclosed herein present significant benefits that would be apparent to one skilled in the art. Furthermore, while multiple embodiments have been presented in the foregoing descriptions, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed descriptions provide those skilled in the art with a convenient road map for implementing the preferred exemplary embodiments of the invention. It being understood that various changes may be made in the function and arrangement of elements described in the exemplary preferred embodiments without departing from the spirit and scope of the invention as set forth in the appended claims.

What is claimed is:

1. A magnetic element comprising:
   a crystolographically disordered seed layer;
   a nanocrystalline template layer formed over said seed layer; and
   a nanocrystalline antiferromagnetic pinning layer formed over said template layer.

2. The magnetic element of claim 1 further comprising a first nanocrystalline ferromagnetic layer formed over said pinning layer.

3. The magnetic element of claim 1 wherein said seed layer is less than 100 Angstroms.

4. The magnetic element of claim 1 wherein said seed layer is less than 50 Angstroms.

5. The magnetic element of claim 1 further comprising:
a base metal layer formed beneath said seed layer; and
a substrate formed beneath said base metal layer.

6. A magnetic element comprising:
a tantalum nitride seed layer;
a nanocrystalline template layer formed over said seed layer; and
a nanocrystalline ferromagnetic pinning layer formed over said template layer.

7. The A magnetic element comprising:
an aluminum seed layer;
a nanocrystalline template layer comprising a transition metal deposited over said aluminum layer; and
a nanocrystalline antiferromagnetic pinning layer formed over said template layer.

8. The magnetic element of claim 7 wherein said transition metal is one of ruthenium and rhodium.

9. The magnetic element of claim 8 wherein said template layer comprises a ruthenium template layer.

10. The magnetic element of claim 7 wherein said transition metal is one of a ruthenium alloy and a rhodium alloy.

11. The magnetic element of claim 7 wherein said template layer comprises a nickel iron (NiFe) template layer.

12. The magnetic element of claim 7 wherein said pinning layer comprises a manganese alloy.

13. The magnetic element of claim 12 wherein said manganese alloy is one of platinum manganese (PtMn), palladium manganese (PdMn), platinum palladium manganese (PtPdMn), iridium manganese (IrMn), iron manganese (FeMn), and rhodium manganese (RhMn).

14. A magnetic element comprising:
a crystallographically disordered seed layer;
a nanocrystalline template layer formed over said seed layer;
a nanocrystalline antiferromagnetic pinning layer formed over said template layer;
a first nanocrystalline ferromagnetic layer formed over said pinning layer;
a coupling layer formed over said first nanocrystalline ferromagnetic layer; and
a second nanocrystalline ferromagnetic layer formed over said coupling layer, wherein said first nanocrystalline ferromagnetic layer, said coupling layer and said second nanocrystalline ferromagnetic layer combine to form a synthetic antiferromagnet.

15. The magnetic element of claim 14 wherein said coupling layer comprises a ruthenium coupling layer.

16. A magnetic element comprising:
a substrate;
a base metal layer formed on said substrate;
a crystallographically disordered TaNx seed layer formed over said base metal layer;
a nanocrystalline Ru template layer formed over said seed layer;
a nanocrystalline antiferromagnetic pinning layer formed over said template layer, said pinning layer comprising an alloy selected from the group of PtMn, PdMn, PtPdMn, IrMn, FeMn, and RhMn;
a synthetic antiferromagnet formed over said pinning layer, said synthetic antiferromagnet comprising:
a first nanocrystalline ferromagnetic layer;
a ruthenium coupling layer formed over said first nanocrystalline ferromagnetic layer; and
a second nanocrystalline ferromagnetic layer formed over said coupling layer;
an AlOx layer formed over said synthetic antiferromagnetic;
a free ferromagnetic layer formed over said AlOx layer; and
a top electrode formed over said free ferromagnetic layer.

17. A method comprising the steps of:
forming a crystallographically disordered seed layer;
forming a nanocrystalline template layer over said seed layer;
forming a nanocrystalline antiferromagnetic pinning layer over said template layer.

18. The method of claim 17 further comprising the step of forming a first nanocrystalline ferromagnetic layer over said pinning layer.

19. A method comprising the steps of:
forming a crystallographically disordered seed layer;
forming a nanocrystalline template layer over said seed layer;
forming a nanocrystalline antiferromagnetic pinning layer over said template layer; and
forming a first nanocrystalline ferromagnetic layer over said pinning layer, wherein the step of forming a crystallographically disordered seed layer comprises the step of forming a TaNx seed layer.

20. The method of claim 19 wherein said step of forming a template layer over said seed layer comprises the step of forming a NiFe template layer over said seed layer.

21. The method of claim 20 wherein said step of forming a template layer over said seed layer comprises the step of forming a Ru template layer over said seed layer.

22. The method of claim 21 wherein said step of forming an antiferromagnetic pinning layer over said template layer comprises the step of forming an antiferromagnetic pinning layer using an alloy selected from the group PtMn, PdMn, PtPdMn, IrMn, FeMn, and RhMn.

23. The method of claim 22 wherein said step of forming said crystallographically disordered seed layer comprises the step of exposing a tantalum layer with a thickness <50 Å to nitrogen atoms, thereby forming a TaNx seed layer.

24. A method comprising the steps of:
forming a crystallographically disordered seed layer;
forming a nanocrystalline template layer over said seed layer;
forming a nanocrystalline antiferromagnetic pinning layer over said template layer;
forming a first nanocrystalline ferromagnetic layer over said pinning layer;
forming a ruthenium coupling layer over said first nanocrystalline ferromagnetic layer;
forming a second nanocrystalline ferromagnetic layer over said ruthenium coupling layer;
forming an AlOx layer over said second nanocrystalline ferromagnetic layer;
forming a free ferromagnetic layer over said AlOx layer; and
forming a top electrode over said free ferromagnetic layer.

25. A method comprising the steps of:
forming a base metal layer over a substrate; forming a Ta layer over said base metal layer, said Ta layer being less than 50 angstroms;
forming a TaNx seed layer by exposing said Ta layer to nitrogen atoms by a plasma or ion-beam nitridization process;

forming a nanocrystalline Ru template layer over said TaNx seed layer;

forming a nanocrystalline antiferromagnetic pinning layer using an alloy selected from the group PtMn, PdMn, PtPdMn, IrMn, FeMn, and RhMn; forming a synthetic antiferromagnet over said pinning layer, said synthetic antiferromagnet comprising:

a first ferromagnetic layer;

a ruthenium coupling layer formed over said first ferromagnetic layer; and a second ferromagnetic layer formed over said ruthenium coupling layer;

forming an AlOx layer over said synthetic antiferromagnet;

forming a free ferromagnetic layer over said AlOx layer; and forming a top electrode over said free ferromagnetic layer.

* * * * *

UNITED STATES PATENT AND TRADEMARK OFFICE
CERTIFICATE OF CORRECTION

| | | |
|---|---|---|
| PATENT NO. | : 6,801,415 B2 | Page 1 of 1 |
| APPLICATION NO. | : 10/232111 | |
| DATED | : August 30, 2002 | |
| INVENTOR(S) | : Jon M. Slaughter | |

It is certified that error appears in the above-identified patent and that said Letters Patent is hereby corrected as shown below:

In Column 7, Line 10, Claim No. 7:
    Change "The A magnetic" to --A magnetic--

Signed and Sealed this

First Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 6,801,415 B2  
APPLICATION NO. : 10/232111  
DATED : October 5, 2004  
INVENTOR(S) : Jon M. Slaughter It is certified that error appears in the above-identified patent and that said Letters Patent is hereby corrected as shown below:

In Column 7, Line 10, Claim No. 7:
    Change "The A magnetic" to --A magnetic--

This certificate supersedes the Certificate of Correction issued April 1, 2008.

Signed and Sealed this

Sixth Day of May, 2008

JON W. DUDAS  
*Director of the United States Patent and Trademark Office*